Oct. 24, 1967 W. C. CORNELL 3,348,693
ENGINE COOLANT FILTER ELEMENT
Filed Sept. 1, 1965
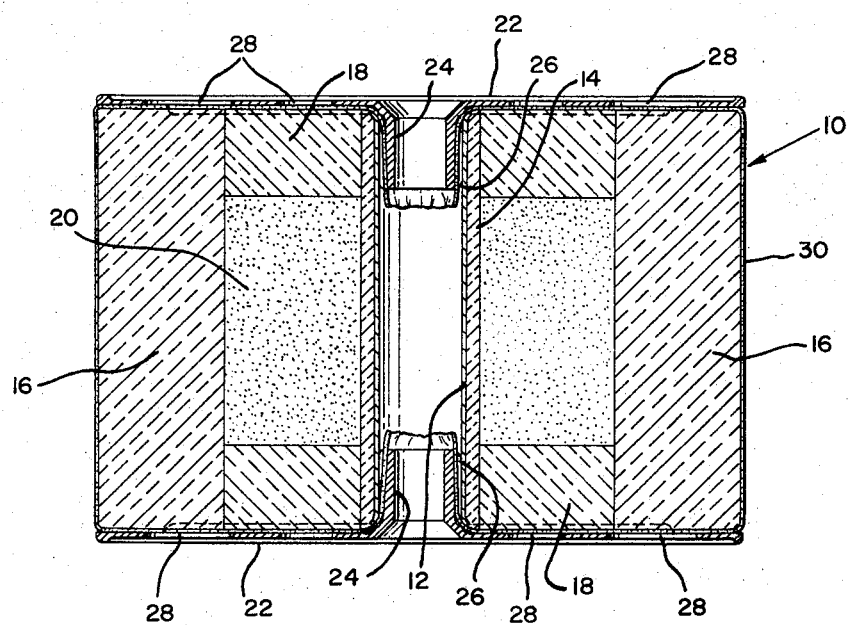
INVENTOR.
WILLIAM C. CORNELL
BY
Hoppe, Mitchell, Murtha & Anderson
ATTORNEYS

United States Patent Office 3,348,693
Patented Oct. 24, 1967

3,348,693
ENGINE COOLANT FILTER ELEMENT
William C. Cornell, 1040 Adrienne Drive,
Alamo, Calif. 94507
Filed Sept. 1, 1965, Ser. No. 484,376
4 Claims. (Cl. 210—282)

The invention relates to a new and improved filtering element and more particularly to a filter construction especially adapted for use in connection with cooling systems for internal combustion engines.

Filtration of the liquid coolants used in internal combustion engines presents a variety of problems. The filter construction must be such as to remove very small solids from the liquid in the cooling system. At the same time the filter must provide a cathodic action so that the electrolysis which takes place in an engine as a result of different metals being used will be dissipated without eating away any of the vital metal parts in the engine. Moreover, proper filtration also requires chemical conditioning of the liquid coolant.

The present invention has for its object the provision of a filter construction which will achieve the three main objects mentioned above in a construction that is both simple and inexpensive.

On the drawing:

The single figure is a vertical sectional view taken through a presently preferred embodiment of the invention.

The invention, in prefered form, comprises a generally cylindrical filter element 10. A central hollow tube 12 which is preferably made from a suitable light weight metal such as aluminum forms the core of the filter element. Immediately adjacent the hollow tube there is a thin layer of filtering media in the form of an inner section 14 of fiberglass cloth. The outer peripheral portions of the cylindrical filtering element also comprise fiberglass filtering media in the form of an annular section 16. The outer peripheral section 16 of fiberglass is spaced from the inner hollow tube 12 at the core of the element by means of annular doughnut-like spacers 18, 18 of fiberglass positioned at the upper and lower ends of the filtering element 10.

The positioning of the fiberglass filtering sections 16, 18, 18 is such that an interior annular space 20 is formed within the filtering element 10. This annular space 20 is filled with a combination of dry chemicals in powder form. The combination of chemicals comprises borax, mercaptobenzothiazole, disodium phosphate and a cation exchange resin. If desired, the chemicals may also contain a dye to color the coolant liquid as an aid in tracing any leaks which may develop in the system.

The preferred make up for the chemicals is as follows:

|  | Percent by volume |
|---|---|
| Borax ($Na_2B_4O_7$) | 42 |
| Mercaptobenzothiazole | 15.7 |
| Disodium phosphate ($Na_2HPO_4$) | 10.5 |
| Exchange resin of polystyrene type such as Duolite C-20 [1] | 31.6 |
| Dye | .2 |

[1] Sold by the Diamond Alkali Company, Western Division, Redwood City, Calif.

At the opposite ends of the filtering element 10, retainer plates 22, 22 are provided for holding the element together. These retainer plates 22, 22 are made from a sacrificial metal, preferably zinc, and are generally circular in configuration with a central inwardly extending annular hub portion 24, 24. The hub portion is provided with outwardly extending ribs 26, 26 which frictionally engage the inner wall of the hollow tube 12 at the core of the filter element 10. The plates 22, 22 are provided with apertures 28, 28 over a substantial portion of their area and the apertures are arranged to permit the flow of water through both the outer fiberglass filtering section 26 of the element and the inner chamber 20 containing the dry chemicals. A cloth retainer 30 is wrapped around the fiberglass sections of the filtering element so as to completely encase the same. The opposite ends of the cloth retainer 30 are inserted within the hollow tube 12 and are retained therein by the insertion of the hubs 24, 24 on the retainer plates 22, 22 into the hollow tube.

What is claimed is:

1. A filter element for use in filtering coolant liquids used in internal combustion engines, comprising fiberglass filtering sections so arranged as to define an internal chamber, dry chemicals positioned in said chamber for conditioning said liquid coolant during use of the filter element, and means for retaining said fiberglass sections in position, said means comprising retainer plates formed from a sacrificial metal.

2. A filter element as set forth in claim 1 wherein the dry chemicals include borax, mercaptobenzothiazole, disodium phosphate and a cation exchange resin.

3. A filter element as set forth in claim 2 wherein said retainer plates are made of zinc.

4. A filter element as set forth in claim 3 wherein said dry chemicals comprise by volume 42% borax, 15.7% mercaptobenzothiazole, 10.5% disoduim phosphate, 31.6% cation exchange resin and .2% dye.

References Cited

UNITED STATES PATENTS

| 2,781,312 | 2/1957 | Klumb et al. | 210—266 X |
| 3,321,085 | 5/1967 | Moorhead | 210—232 |

FOREIGN PATENTS 163,328   6/1955   Australia.

SAMIH N. ZAHARNA, *Primary Examiner.*